United States Patent [19]
Rieger et al.

[11] Patent Number: 5,637,672
[45] Date of Patent: Jun. 10, 1997

[54] POLYIMIDES FOR STN DISPLAYS

[75] Inventors: Bernhard Rieger, Yokohama, Japan; Ekkehard Bartmann, Erzhausen; Eike Poetsch, Mühltal, both of Germany

[73] Assignee: Merck Patent Gesellschaft mit beschrankter Haftung, Darmstadt, Germany

[21] Appl. No.: 678,360

[22] PCT Filed: Aug. 18, 1990

[86] PCT No.: PCT/EP90/01358

§ 371 Date: Apr. 18, 1991

§ 102(e) Date: Apr. 18, 1991

[87] PCT Pub. No.: WO91/02765

PCT Pub. Date: Mar. 7, 1991

[30] Foreign Application Priority Data

Aug. 21, 1989 [DE] Germany ............. 39 27 498.5

[51] Int. Cl.⁶ ............. C08G 73/10; G02B 1/04
[52] U.S. Cl. ............. 528/353; 528/125; 528/126; 528/128; 528/172; 528/173; 528/174; 528/179; 528/188; 528/220; 528/229; 528/272; 528/274; 528/350; 528/351; 428/1; 385/129; 385/130; 385/143
[58] Field of Search ............. 528/353, 351, 528/350, 125, 126, 128, 179, 220, 172, 229, 173, 272, 174, 274, 188; 428/1; 385/129, 130, 143; 359/36

[56] References Cited

U.S. PATENT DOCUMENTS

| 3,726,834 | 4/1973 | Acle, Jr. ............. | 528/353 |
|---|---|---|---|
| 4,467,000 | 8/1984 | Economy et al. ............. | 427/473.5 |
| 4,551,522 | 11/1985 | Fryd et al. ............. | 528/353 |
| 4,735,492 | 4/1988 | Sekine et al. ............. | 528/353 |
| 4,749,777 | 6/1988 | Kohtoh et al. ............. | 528/353 |
| 4,781,439 | 11/1988 | Yokokura et al. ............. | 528/26 |
| 4,822,853 | 4/1989 | Uekita et al. ............. | 528/125 |
| 4,859,876 | 8/1989 | Dirk et al. ............. | 350/96.14 |
| 4,874,835 | 10/1989 | Berdahl ............. | 528/353 |
| 4,897,461 | 1/1990 | Uekita et al. ............. | 528/125 |
| 5,108,201 | 4/1992 | Matsuura et al. ............. | 385/143 |

FOREIGN PATENT DOCUMENTS

| 0059790 | 9/1982 | European Pat. Off. . |
|---|---|---|
| 0338674 | 10/1989 | European Pat. Off. . |

*Primary Examiner*—Samuel A. Acquah
*Assistant Examiner*—P. Hampton-Hightower
*Attorney, Agent, or Firm*—Millen, White, Zelano & Branigan, P.C.

[57] ABSTRACT

Polyamide esters which can be prepared from tetracarboxylic dianhydrides and can be converted into polyimides by alcohol cleavage with cyclization, characterized in that the radicals OR of the ester groups —COOR which are substituted during the polyimide formation are alkoxy radicals having 2 to 5 C atoms which are monosubstituted or polysubstituted by fluorine.

Polyimides prepared therefrom are suitable as orientation layers in liquid-crystal display elements and in optical wave guides.

15 Claims, No Drawings

POLYIMIDES FOR STN DISPLAYS

BACKGROUND OF THE INVENTION

The invention relates to polyamide esters which can be prepared from tetracarboxylic dianhydrides and can be converted into polyimides by alcohol cleavage with cyclization, characterized in that the radicals OR in the ester groups —COOR, which are substituted during the polyimide formation, are alkoxy radicals having 2 to 5 C atoms which are monosubstituted or polysubstituted by fluorine.

Polyimides are known as orientation layers in liquid-crystal displays and have proven successful due to their good optical and thermal properties. They are also employed, in particular, in supertwist liquid-crystal display elements (SLC display elements). This is taken to mean relatively highly twisted display elements with a twist angle having a value in between 160° and 360°, such as, for example, the display elements according to Waters et al. (C. M. Waters et al., Proc. Soc. Inf. Disp. (New York) (1985) (3rd Intern. Display Conference, Kobe, Japan), STN-LCDs (German Offenlegungsschrift 3,503,259), SBE-LCDs (T. J. Scheffer and J. Nehring, Appl. Phys. Lett. 45 (1984) 1021), OMI-LCDs (M. Schadt and F. Lennhouts, Appl. Phys. Lett. 50 (198U), 236), DST-LCDs (European Published Specification 0,246,842) or BW-STN-LCDs (K. Kawasaki et al., SID 87 Digest 391 (20.6)).

To produce supertwist display elements, orientation materials are required which induce a high tilt angle of the liquid crystal in the display; the angle should be at least about 3°.

It is known that polyimides prepared, for example, by reaction of the following components

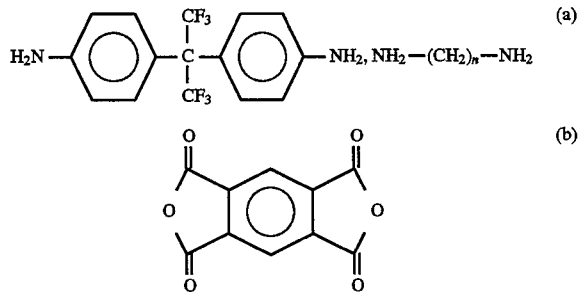

cause tilt angles of greater than 3° (for example European Published Specification 231,781).

Polyimides of this type are usually prepared by first reacting tetracarboxylic acids with diamines to give polyamidocarboxylic acids, which are then cyclized with elimination of water to form polyimides (for example European Published Specification 0,249,881, European Published Specification 0,231,781 and European Published Specification 0,219,336). Alternatively, the tetracarboxylic anhydride can first be converted into another derivative, for example a dicarboxylic acid diester, after which the ester component is further reacted with an amine component to form the polyamidocarboxylic acid (U.S. Pat. No. 4,467,000).

European Published Specification 0,209,114 describes polyamide esters which can be converted into polyimides by alcohol cleavage. However, the invention relates to amphiphilic compounds, i.e. the alcohol component contains long alkyl chains.

Polyamide esters have furthermore been described in connection with photopolymerizable polyamide acid derivatives (for example European Published Specification 0,203,372).

SUMMARY OF THE INVENTION

The invention had the object of developing further polyimide precursors which can easily be converted into polyimides, the polyimides and their precursors having further advantages over the prior art.

This object is achieved by the provision of the polyamide esters according to the invention.

Surprisingly, it has been found that polyamide esters whose alcohol component contains alkoxy radicals which are monosubstituted or polysubstituted by fluorine cyclize to form polyimides even at very low temperatures. The imidation begins even at temperatures well below 200° C. This corresponds approximately to the lower range of known imidation temperatures. However, it is much more surprising that the polyamide esters according to the invention are virtually to completely colourless and also do not discolour during the imidation. The known polyamide esters are usually already yellow, and some are even yellow-brown or even grey-green (for example EP 0,209,114).

This opens up a further broad field of application for the polyimides according to the invention. Due to their advantageous optical properties, they can be employed in optical wave guides and thus in a very wide variety of optical components.

The invention therefore relates to polyamide esters which can be prepared from tetracarboxylic dianhydrides and can be converted into polyimides by alcohol cleavage with cyclization, characterized in that the radicals OR of the ester groups —COOR which are substituted during the polyimide formation are alkoxy radicals having 2 to 5 C atoms which are monosubstituted or polysubstituted by fluorine.

The invention furthermore relates to a process for the preparation of the polyamide esters according to the invention which is characterized in that a tetracarboxylic dianhydride is reacted with an aliphatic alcohol having 2 to 5 C atoms which is monosubstituted or polysubstituted by fluorine, and with a diamine in any desired sequence, —COO(H) groups formed after the first reaction step optionally being converted into reactive derivatives.

The invention also relates to polyimides prepared from the polyamide esters according to the invention, and to liquid-crystal display elements and optical components containing the polyimides according to the invention.

The polyamide esters according to the invention are compounds containing structural units of the general formula I

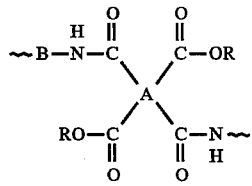

A is a tetravalent organic radical having at least two C atoms, B is a divalent organic radical having at least two C atoms, and R is an alkyl radical having two to five C atoms which is monosubstituted or polysubstituted by fluorine.

The components from which the compounds of the formula I are synthesized, independently of the synthetic route, are firstly a tetracarboxylic dianhydride (contains A), secondly a diamine (contains B), and thirdly an alcohol (contains R).

Examples of tetracarboxylic dianhydrides are aromatic dianhydrides of pyromellitic acid, benzophenonetetracarboxylic acid, biphenyltetracarboxylic acid, and alicyclic dianhydrides of cyclobutane-, cyclopentane- and cyclohexanetetracarboxylic acid. For the preparation of the polyamide esters according to the invention, the tetracarboxylic dianhydrides can be employed alone or mixed with one another.

Examples of diamines are aromatic diamines, such as p-phenylenediamine, m-phenylenediamine, o-phenylenediamine, 4,4'-diaminodiphenylmethane, 4,4'-diaminodiphenyl ether, 2,2-bis(4-aminophenyl)propane, diaminodiphenyl sulfone, diaminobenzophenone, 1,5-diaminonaphthalene, 1,3-bis(4-aminophenoxy)benzene, 1,4-bis(4-aminophenoxy)benzene, 4,4'-di(4-aminophenoxy)diphenyl sulfone, 2,2-bis[4-(4-aminophenoxyphenyl)propane], 2,2-bis(4-aminophenyl)hexafluoropropane, 2,2-bis[4-(4-aminophenoxy)phenyl]hexafluoropropane, and alicyclic diamines, such as, for example, 1,4-diaminocyclohexane, 1,3-diaminocyclohexane, 4,4'-diaminodicyclohexylmethane, 4,4'-diamino-3,3'-dimethyldicyclohexylmethane, 4,4'-diaminodicyclohexyl sulfone, 4,4'-diaminodicyclohexyl ether, and aliphatic diamines, such as 1,2-diaminoethane, 1,3-diaminopropane, 1,4-diaminobutane, 1,5-diaminopentane, 1,6-diaminohexane, 1,7-diaminoheptane and 1,8-diaminooctane.

For the preparation of the polyamide esters according to the invention, the diamines can be employed alone or mixed with other diamines.

It is also possible to employ other tetracarboxylic dianhydrides and diamines, for example those described or listed in DE 3,107,519, EP 0,209,114, EP 0,219,336, EP 0,231,781 and EP 0,249,881.

The third component for the synthesis of the polyamide esters according to the invention, the alcohol of the formula I containing the radical R, is an alcohol having 2, 3, 4 or 5 C atoms which is at least monosubstituted by fluorine, for example 2,2,2-trifluoroethanol. The polyamide esters according to the invention can be prepared by reacting a tetracarboxylic dianhydride with an alcohol to form a diester or with a diamine to form a corresponding oligomeric or polymeric amidic acid, and converting the diester or amidic acid into the polyamide ester using the final component, the diamine or the alcohol, either directly or via a reactive derivative of the free COO(H) group.

The individual reactions are common and customary carbonyl reactions known to those skilled in the art and are described in the relevant standard works of preparative organic chemistry, such as, for example, in Houben-Weyl, Methoden der organischen Chemie [Methods of Organic Chemistry], Georg Thieme Verlag, Stuttgart.

For example, the tetracarboxylic dianhydride can first be converted into the diester in a suitable solvent, such as, for example, tetrahydrofuran. The resultant COO(H) groups can subsequently be converted into more reactive groups, preferably under mild reaction conditions. They are usually converted into carboxylic acid halides, preferably into carboxylic acid chlorides, using thionyl chloride. The reaction to form the polyamide ester is likewise preferably carried out under mild conditions, using the desired diamine with addition of an auxiliary base, for example pyridine.

Alternatively, the tetracarboxylic acid diesters can also be polycondensed directly with the diamine to form the polyamide ester; the condensing agent employed is preferably a carbodiimide, for example dicyclohexylcarbodiimide (DCC), as described in DE 3,411,660.

The polyamide esters according to the invention are distinguished by the fact that polyamide formation sets in at very low temperatures, well below 200° C.

At the same time, the polyamide esters are themselves virtually to completely colourless and also do not discolour during the imidation.

The polyimides prepared by the process according to the invention are thus distinguished by their virtual or complete lack of colour compared with those prepared by known processes, although they are in some cases structurally identical therewith. The polyimides according to the invention are predominantly imidated, i.e. they contain only a low proportion of ester groups, if any at all. The degree of imidation is generally 95% or more.

The polyimides according to the invention can be employed, on the one hand, as orientation layers in liquid-crystal display elements, in particular also in those having high twist angles, such as STN, SBE or also OMI displays, in which high tilt angles of the liquid crystal are necessary.

For the production of polyimide orientation layers, the polyamide esters according to the invention are applied to a substrate (for example glass or metal) by known methods, for example by spin coating, spraying, brushing, printing or simple dipping.

It is expedient here to use a polymer solution in a suitable solvent, such as dimethylformamide, dimethylacetamide, dimethyl sulphoxide, N-methyl-2-pyrrolidone or in a comparable solvent. After drying, curing is subsequently carried out in vacuo. The imidation begins well below 200° C., in individual cases even below 150° C. Heating is carried out for one hour at about 200°–250° C.

The polyimides according to the invention are furthermore particularly suitable for use in optical wave guides due to their advantageous optical properties. This opens up the way to optical components, for example in the area of integrated optics or sensor and communication technology. Optical components are described, for example, in EP 0,218,938.

The working examples below are intended to illustrate the invention, without representing a limitation.

EXAMPLE 1

Preparation of Polyamide Esters 14.39 ml (0.2 mol) of 2,2,2-trifluoroethanol are added dropwise with stirring at 15° C. to a solution of 32.2 g (0.1 mol) of 3,3',4,4'-benzophenonetetracarboxylic dianhydride in 234 ml of tetrahydrofuran. After the mixture has been stirred for 30 minutes, 33.42 ml of pyridine are added dropwise at 15° C. After a further 3 hours, the mixture is cooled to −10° C., and 14.55 ml of thionyl chloride are slowly added dropwise with vigorous stirring. After 2 hours at −10° C., a solution of 46.68 g (0.09 mol) of 2,2-bis[4-(4-aminophenoxy)phenyl]hexafluoropropane in 66.8 ml of dimethylacetamide is added dropwise, and the mixture is stirred for a further 30 minutes. After the mixture has been warmed to 15° C., 15.02 ml of acetyl chloride are added and, after a further 4 hours, 55.54 ml of ethanol are added. The solution is transferred into water containing Titriplex®-IV (Messrs. Merck, 5 l of H$_2$O/250 mg of Titriplex®-IV). The resultant precipitate is filtered off with suction, dried at room temperature and dissolved in tetrahydrofuran, and the solution is stirred every 2 hours with the ion exchanger III and I (Messrs. Merck). After the second ion exchanger has been filtered off with suction, the mixture is stirred into H$_2$O/Titriplex®-IV (5 l/spatula tip) and the solid is filtered off with suction and dried as above. A virtually colourless (only slightly yellowish) powder of the polyamide ester a is obtained.

The polyamide esters are prepared analogously using the components

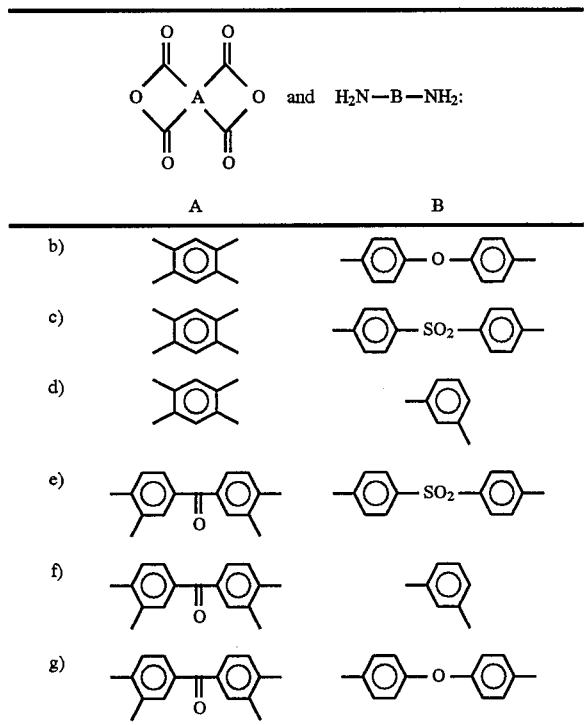

EXAMPLE 2

Polyimides

The polymers 1 a to 1 g are spin-coated from a 3% solution in N-methyl-2-pyrrolidone (NMP) onto glass plates (Baltracon Z 20) coated with ITO (indium/tin oxide), and subsequently cured for one hour at 250° C. in vacuo. The polyimide-coated glass plates are subsequently rubbed in one direction with a rayon cloth (M. E. Becker et al., Mol. Cryst. Liq. Cryst. 132, 167–180 (1986)). In order to determine the tilt angle, a cell with a distance between the glass plates of 50 µm and an antiparallel arrangement (with regard to the rubbing direction) of the glass plates to one another is constructed. The cell is filled by capillary forces by dipping it into the liquid crystal. The liquid crystal is subsequently isotropized. The polyimides prepared from polyamide esters 1 d and 1 g exhibit a tilt angle of 3.7° as orientation layers on investigation with the liquid crystal mixture ZLI-2293, Messrs. Merck. The tilt angle is determined as described by A. Mosley and B. Nicholas in Displays, 1987, pp. 17–21.

EXAMPLE 3

The polyamide ester 1 d is dissolved to form a 20% solution in NMP and, as described in Example 2, spin-coated onto a glass plate (thickness: 1.1 mm) and cured. A transparent, colourless film whose thickness was determined as being 1 µm using an α-stepper is obtained.

The absorption of the film is determined using a spectrometer. The film exhibits an absorption of less than 0.01 at 800 nm and less than 0.015 at 400 nm.

For comparison, a typical, commercially available, yellowish film (Problmide 32, Ciba-Geigy) was measured. The film exhibits absorption properties which are typical of such films: 0.03 at 800 nm and 1.4 at 400 nm.

We claim:

1. Polyamide esters which can be prepared from tetracarboxylic dianhydrides and can be converted into polyimides by alcohol cleavage with cyclization at a curing temperature of less than 250° C., characterized in that the radicals OR of the ester groups —COOR which are substituted during the polyimide formation are alkoxy radicals having 2 to 5 C atoms which are monosubstituted or polysubstituted by fluorine.

2. Process for the preparation of polyamide esters according to claim 1, characterized in that a tetracarboxylic dianhydride is reacted with an aliphatic alcohol having 2 to 5 C atoms which is monosubstituted or polysubstituted by fluorine, and with a diamine, in any desired sequence.

3. Process according to claim 2, characterized in that the first reaction is with an alcohol.

4. Polyimides which have been prepared from polyamide esters, wherein said polyamide esters a) can be prepared from tetracarboxylic dianhydrides, b) can be converted into polyimides by alcohol cleavage with cyclization, and c) have alkoxy radicals OR of the ester groups —COOR which are substituted during the polyimide formation, have 2 to 5 C atoms, and are monosubstituted or polysubstituted by fluorine.

5. A method of using polyimides according to claim 4 as orientation layers in liquid-crystal display elements which comprise incorporating said polyimide into an orientation layer of a liquid crystal display element.

6. Liquid-crystal display element, containing orientation layers containing polyimides according to claim 4.

7. A method of using polyimides according to claim 4 in optical wave guides which comprise incorporating said polyimide into an optical wave guide.

8. An apparatus containing optical wave guides containing polyimides according to claim 4.

9. A process as in claim 2, wherein the —COO(H) groups formed after the tetracarboxylic dianhydride is first reacted with an aliphatic alcohol or a diamine are converted into reactive derivatives.

10. Polyimides which have been prepared from polyamide esters by alcohol cleavage with cyclization at a curing temperature of less than 250° C., wherein said polyamide esters:

(a) can be prepared from tetracarboxylic dianhydrides, diamines and alcohols; and (b) have alkoxy radicals OR of the ester groups —COOR, which are substituted during the polyamide formation, have 2 to 5 carbon atoms and are monosubstituted or polysubstituted by fluorine.

11. A liquid crystal display element containing an orientation layer which comprises layers containing polyimides according to claim 10.

12. An optical waveguide which comprises polyimides according to claim 10.

13. Polyimides, as in claim 4, which have been prepared from polyamide esters by alcohol cleavage with cyclization at a curing temperature of less than 250° C.

14. Polyimides, as in claim 4, which have been prepared from polyamide esters of general formula I

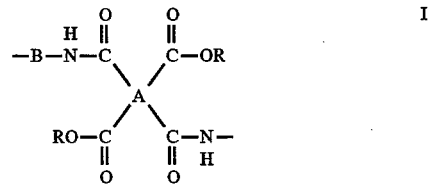

wherein A is a tetravalent organic radical having at least two C atoms, B is a divalent, organic radical having at least two C atoms, and R is an alkyl radical having 2 to 5 C atoms which is monosubstituted or polysubstituted by fluorine.

15. Polyamide esters containing structural units of a general formula I

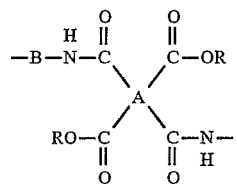

wherein A is a tetravalent organic radical having at least two C atoms, B is a divalent, organic radical having at least two C atoms, and R is an alkyl radical having 2 to 5 C atoms which is monosubstituted or polysubstituted by fluorine, which can be prepared from tetracarboxylic dianhydrides and can be converted into polyimides by alcohol cleavage with cyclization.

* * * * *